United States Patent [19]
Funt et al.

[11] Patent Number: 5,907,629
[45] Date of Patent: May 25, 1999

[54] METHOD OF ESTIMATING CHROMATICITY OF ILLUMINATION USING NEURAL NETWORKS

[76] Inventors: Brian Vicent Funt, 1149 Eyremount Drive, West Vancouver, Canada, V7S 2C4; Vlad Constantin Cardei, 234 N. Ranelagh Avenue, Burnaby, Canada, V5B 1H8; Jacobus Joubert Barnard, 809 Everett Crescent, Burnaby, Canada, V5A 2N3

[21] Appl. No.: 08/746,725

[22] Filed: Nov. 15, 1996

[51] Int. Cl.$^6$ .............................. G06K 9/00; G06K 9/62
[52] U.S. Cl. ........................ 382/162; 382/156; 382/157
[58] Field of Search .................................. 382/162, 167, 382/156, 158, 157; 358/516, 518, 520, 521, 523, 515; 348/223, 225, 228

[56] References Cited

U.S. PATENT DOCUMENTS

| | | | |
|---|---|---|---|
| 4,648,051 | 3/1987 | Wandell et al. | 364/125 |
| 4,685,071 | 8/1987 | Lee | 364/526 |
| 4,992,963 | 2/1991 | Funt et al. | 364/526 |
| 5,351,079 | 9/1994 | Usui et al. | 348/223 |

OTHER PUBLICATIONS

"The Retinex Theory of Color Vision", Land, Scientific American, 1977, pp. 108–129.

"Necessary and Sufficient Conditions for Von Kries Chromatic Adaptation to Give Color Constancy", West et al, J. Math. Biology, 1982, pp. 249–258.

Color Science: Concepts and Methods, Quantitative Data and Formulae, 2nd Edition, Gunter Wyszecki and W.S. Stiles, John Wiley & Sons Inc. 1982, pp. 164–168.

"Color constancy: a method for recovering surface spectral reflectance", Maloney et al, J. Optical So. of Am., 1985, pp. 293–297.

(List continued on next page.)

*Primary Examiner*—Leo H. Boudreau
*Assistant Examiner*—Dmitry Novik
*Attorney, Agent, or Firm*—Oyen Wiggs Green & Mutala

[57] ABSTRACT

A method of estimating the chromaticity of illumination of a colored image consisting of a plurality of color-encoded pixels. The image colors are first mapped into an intensity-independent chromaticity space which is then divided into a plurality of separate regions. For each region, a first binary value is assigned to the region if the region contains no chromaticity value; or, a second binary value is assigned to the region if it does contain a chromaticity value. The assigned values are then applied as inputs to a pre-trained neural network having two output ports and at least one intermediate layer containing a plurality rality of ports connectible between selected input ports and the output ports. The chromaticity space values which characterize the input image's chromaticity of illumination are then derived at the output ports. The network is pretrained trained by initially connecting an arbitrary number of the intermediate layer ports to selected input layer ports. A weight value is associated with each connection. The weight values, which have the effect of altering signals transmitted along each connection by a selected amount, are initialized with random values. Each one of a plurality of pre-stored data sets, each containing values characterizing presence or absence of color in selected regions of one of a corresponding plurality of known colored images, are sequentially presented as inputs to the network and the chromaticity space values derived at the output ports are compared with known chromaticity space values characterizing illumination of the known colored image to derive an error value representative of difference therebetween. The weight values are adjusted in response to the inputs in accordance with the well known back propagation algorithm. After the weights are adjusted the intermediate layer ports are adaptively reconnected to the input layer ports to eliminate connections to input layer ports which repeatedly receive zero value inputs. The training process continues until the error value is less than a selected threshold.

13 Claims, 4 Drawing Sheets

OTHER PUBLICATIONS

"Mechanisms of Color Constancy", D'Zmura et al, J. Opt. Soc. Am., Oct. 1986, pp. 1662–1672.

"An Introduction to Computing with Neural Nets", Lippmann, IEEE ASSP Magazine, Apr., 1987, pp. 11–15.

"From [R,G,B] to Surface Reflectance: Computing Color Constant Descriptors in Images", Gershon et al, Perception, 1988, pp. 755–758.

"A Novel Algorithm for Color Constancy", Forsyth, Intl. J. of Computer Vision, 1990, pp. 5–36.

"Spectral sharpening: sensor transformations for improved color constancy", Finlayson et al, J. Optical So. of Am., May, 1994, pp. 1553–1563.

"Color constancy: generalized diagonal transforms suffice", Finlayson et al, J. Optical So. of Am., Nov., 1994, pp. 3011–3019.

"Network Simulations of Retinal and Cortical Contributions to Color Constancy", Courtney et al, Vision Res., 1995, pp. 413–434.

"Color Constancy in Diagonal Chromaticity Space", Finlayson, Proc. IEEE Fifth Intl. Conf. on Computer Vision, Jun., 1995, pp. 218–223.

"Color Constancy Under Varying Illumination", Finlayson et al, Proc. IEEE Fifth Intl. Conf. on Computer Vision, Jun., 1995, pp. 720–725.

"Colour Constancy for Scenes with Varying Illumination", Barnard et al in Computer Vision — ECCV '96, 4th European Conference on Computer Vision, (Cambridge, UK, Apr. 15–18, 1996, Proceedings, vol. II, Springer: Berlin) Bernard Buxton and Roberto Cipolla (Eds.) in Lecture Notes in Computer Science, 1065, G. Goos, J. Hartmanis and J. van Leeuwen (Eds.).

"Introduction To The Theory of Neural Computation", Hertz et al, Lecture Notes vol. I, Santa Fe Institute, Studies in the Sciences of Complexity, (Addison–Wesley Publishing Company, The Advanced Book Program: California, 1991), pp. 115–121.

| Number of Surfaces | 1 | | 2 | | 3 | | 5 | | 10 | |
|---|---|---|---|---|---|---|---|---|---|---|
| Error | mean | st. dev. | mean | st. dev. | mean | st. dev. | mean | st. dev. | mean | st. dev. |
| Minimum attainable error using 2D diagonal model | 0.908 | 0.0 | 0.908 | 0.0 | 0.908 | 0.000 | 0.908 | 0.000 | 0.908 | 0.000 |
| Grey World | 22.23 | 12.00 | 16.17 | 8.946 | 12.87 | 7.759 | 9.341 | 5.604 | 7.122 | 3.764 |
| White Patch | 22.23 | 12.00 | 16.93 | 9.542 | 14.02 | 8.910 | 8.887 | 5.824 | 6.871 | 4.558 |
| Gamut Mapping: surfaces only | 33.64 | 15.96 | 23.41 | 13.65 | 16.33 | 12.09 | 12.61 | 9.460 | 7.881 | 5.346 |
| Gamut Mapping: surfaces plus illumination | 8.051 | 2.812 | 7.525 | 3.350 | 6.501 | 2.914 | 5.918 | 3.254 | 4.746 | 2.281 |
| Neural Net | 13.05 | 3.345 | 10.40 | 4.245 | 8.205 | 4.291 | 6.184 | 3.502 | 4.902 | 2.833 |

FIG. 4

| Number of Surfaces | 1 | | 2 | | 3 | | 5 | | 10 | |
|---|---|---|---|---|---|---|---|---|---|---|
| Error | mean | st. dev. | mean | st. dev. | mean | st. dev. | mean | st. dev. | mean | st. dev. |
| No color correction | 1.072 | 0.000 | 1.072 | 0.000 | 1.07 | 0.00 | 1.07 | 0.00 | 1.07 | 0.000 |
| Minimum attainable error using 2D diagonal model | 0.126 | 0.000 | 0.126 | 0.000 | 0.12 | 0.00 | 0.12 | 0.00 | 0.12 | 0.000 |
| Grey World | 2.511 | 5.102 | 1.096 | 0.916 | 0.88 | 0.90 | 0.56 | 0.30 | 0.45 | 0.206 |
| White Patch | 2.511 | 5.102 | 1.147 | 0.976 | 0.96 | 1.00 | 0.54 | 0.33 | 0.43 | 0.241 |
| Gamut Mapping: surfaces only | 20.13 | 51.11 | 3.545 | 5.686 | 1.80 | 2.88 | 1.02 | 1.15 | 0.52 | 0.500 |
| Gamut Mapping: sufaces plus illumination | 0.499 | 0.144 | 0.466 | 0.178 | 0.41 | 0.15 | 0.38 | 0.17 | 0.31 | 0.130 |
| Neural Net | 0.758 | 0.157 | 0.628 | 0.208 | 0.51 | 0.22 | 0.40 | 0.18 | 0.32 | 0.165 |

FIG. 5

METHOD OF ESTIMATING CHROMATICITY OF ILLUMINATION USING NEURAL NETWORKS

FIELD OF THE INVENTION

This application pertains to a method for converting pixel values representing colors in a digitized color image from an illumination-dependent form to a standard, controlled-illumination form by estimating the color of the ambient illumination, without requiring a set of known calibration colors to appear in the image.

BACKGROUND OF THE INVENTION

Colors expressed in a standardized form are preferable because they can be used, for example, by a robot to recognize objects on the basis of color. Non-standardized colors are so variable that a robot can not make reliable decisions on the basis of color.

Colors expressed in standardized form are also useful for reproducing the colors in images more accurately. For example, the colors in a color image captured by a camera under illumination conditions that differ in color temperature from those for which the camera is color balanced will generally look "wrong". For example, if a camera balanced for indoor incandescent light is used in outdoor daylight conditions, colors in the outdoor-captured image will look too blue since there is more blue in the daylight than there is in the indoor incandescent light.

Digital color images can be created either by direct digital imaging on a charge-couple device ("CCD") chip, by digitization of a video camera's analog output, or by digitization of images printed on paper, transparencies or film. In each case the basic principle whereby the resulting digital pixel values composing the image colors are created is the same. In particular, the spectral power distribution (spectrum) of the light reflected from a point on a matte surface is generally the product of the spectral power distribution of the illumination incident at that point and the percent surface spectral reflectance function of the surface. For a surface with a shiny, specular component the reflected light also includes a second component which has the same spectrum as the incident illumination. In either case, the spectrum of the reflected light as a function of position forms the light entering the camera and is known as the color signal. For each pixel, the digital color image's value depends on the imaging device's spectral sensitivity functions and on the spectrum of the incoming color signal.

For sensitivity functions which are sensitive over a relatively narrow range of wavelengths and which do not overlap significantly, the change in the resulting pixel value created by a change in the incident image illumination can be approximated well by scaling by the amount by which the color of the incident illumination changed. In this context, "the color of the incident illumination" means the camera's response to an ideal white surface viewed under that illumination. If the sensitivity functions are not relatively narrow band, then a technique called "spectral sharpening" can be used to combine the output responses of the functions, prior to scaling, in order to optimize the scaling performance (see: Finlayson et. al. "Spectral Sharpening: Sensor Transformations for Improved Color Constancy", J. Opt. Soc. America, May, 1994, pp. 1553–1563). If the color of the ambient illumination can be determined, then the difference between the color of the ambient illumination and the desired illumination can be used to produce an image which is colored as if it were taken under the desired illumination. This process is often described as color correction. The present invention facilitates accurate estimation of ambient illumination and thereby facilitates image color correction.

The "grey-world" method is one well known prior art technique for estimating the color of the incident illumination. With the grey-world method, the color of the incident illumination is estimated as the average of color in the image. This method is very unreliable because the average is very unstable. For example, the image of a large field of grass will be primarily green, so the average color in the image will be green, even though the skylight illumination illuminating the grass is far from green. Color correction of such an image based on the grey-world technique produces readily perceptible color errors throughout the image.

Another prior art method of estimating the color of the incident illumination is the Retinex method (see: "The Retinex Theory of Color Vision", E.H. Land, Scientific American, 1977, pp. 108–129). This method effectively uses the maximum value found within the image for each of the three RGB color channels as the estimate of the color of the illumination. This method is unstable because it depends on the assumption that somewhere in every scene there will be a surface which is maximally reflective in each of the three color channels. This assumption is frequently violated.

Another prior art method of estimating the color of the incident illumination is described by Wandell et al in U.S. Pat. No. 4,648,051. For 3-band color images, Wandell et al calculate the best two-dimensional subspace of the three-dimensional space of image colors and then extract a model of the illumination based on the normal to that subspace. Unfortunately, this method is unreliable because the assumption that colors will lie in a two-dimensional subspace is generally violated.

Another prior art technique estimates the spectrum of the incident illumination, from which its color is easily derived, by placing a set of surfaces of known percent spectral reflectance in the image where their color will be recorded in the image. This method has limited practical utility, since in general it is not possible to include the known surfaces in the image prior to imaging the image.

The 2D convex hull gamut mapping algorithm is another prior art technique, which considers the set of possible illuminants that could map the observed gamut of image pixels to a canonical gamut of expected possible pixels under the standard, known illuminant. See: "Color Constancy in Diagonal Chromaticity Space", Finlayson, Proc. IEEE Fifth Intl. Conf. on Computer Vision, June, 1995, pp. 218–223. Although gamut mapping sometimes yields more accurate results than other prior art techniques, it is more time consuming.

Von Kries adaptation is another prior-art color correction technique which can be used once the illumination is known. This is a process of scaling the RGB channels by a correction factor. See: "Necessary and Sufficient Conditions for Von Kries Chromatic Adaptation to Give Color Constancy", West et al, J. Math. Biology, 1982, pp. 249–258.

U.S. Pat. No. 5,351,079 Usui describes a method of estimating the illumination by using a 3-input, 3-output neural network as a decorrelator to minimize the correlation between the R, B and G bands of a color image. The neural network by itself does not accomplish color constancy; instead, it is trained to decorrelate the R, G, and B bands from one another. Usui's neural network uses only 6 weights, depends on unsupervised instead of supervised learning, uses a feedback instead of a feed forward process, and functions only to decorrelate the signals in the color bands. Moreover, Usui performs passive input-image-independent color correction. In other words, Usui's correction steps are fixed once his neural network has been trained. By contrast, the present invention uses the input image data to adaptively determine the color correction to be applied.

SUMMARY OF THE INVENTION

In accordance with the preferred embodiment, the invention provides a method of estimating the chromaticity of illumination of a colored image consisting of a plurality of color-encoded pixels. The image colors are first mapped into an intensity-independent chromaticity space which is then divided into a plurality of separate regions. For each region, a first binary value is assigned to the region if the region contains no chromaticity value; or, a second binary value is assigned to the region if it does contain a chromaticity value. The assigned values are then applied as inputs to the input layer of a pre-trained neural network having an output layer with two output ports and at least one intermediate layer containing a plurality of ports connectible between selected input ports and the output ports. The chromaticity space values which characterize the input image's chromaticity of illumination are then derived at the output ports.

The neural network is pre-trained by initially connecting an arbitrary number of the first intermediate layer ports to selected ones of the input layer ports. All other layers' ports are either fully or partially connected. A weight value is associated with each connection. The weight values, which have the effect of altering signals transmitted along each connection by a selected amount, are initialized with random values. Each one of a plurality of pre-stored data sets, each containing values characterizing presence or absence of color in selected regions of one of a corresponding plurality of known colored images, are sequentially presented as inputs to the neural network and the chromaticity space values derived at the output layer's output ports are compared with known chromaticity space values characterizing illumination of the known colored image to derive an error value representative of difference therebetween. The weight values are adjusted in response to each input in accordance with the well known back propagation algorithm. During each training "epoch", all of the data sets are sequentially input to the network and the weight values adjusted as aforesaid. After each epoch, the intermediate layer ports are adaptively reconnected to the input layer ports to eliminate connections to input layer ports which repeatedly receive zero value inputs. The entire training process continues through further epochs until the error value is less than a selected threshold.

BRIEF DESCRIPTION OF THE DRAWINGS

FIG. 4 is a table comparing average angular error values obtained by applying the methodology of the invention to various images with average angular error values obtained by applying prior art methodologies to the same images.

FIG. 5 is a table comparing root mean square error values obtained by applying the methodology of the invention to various images with average angular error values obtained by applying prior art methodologies to the same images.

DETAILED DESCRIPTION OF THE PREFERRED EMBODIMENT

The "problem" is to determine the illuminant under which a given scene was imaged by a camera, without prior knowledge of the scene; or, to determine what an unknown scene, imaged under an unknown illuminant, would look like if illuminated by a given illuminant.

The most common prior art methodologies make a series of assumptions in an attempt to constrain the problem. For example, the prior art "grey-world" algorithm assumes that the average of all colors in a scene is grey, i.e. the red, green and blue components of the average color are equal. By computing the actual departure of the average color from the assumed grey color, the grey-world algorithm determines the color of the illuminant. As another example, the prior art "white patch" or "Retinex" algorithm assumes that the color components of the illuminant are the maximum values of the components, over all colors in a scene.

The present invention makes no such assumptions respecting the unknown scene. Instead, a neural network is used to adaptively estimate the unknown scene's chromaticity of illumination. Before any unknown scene image is presented to the neural network for analysis, the network is first trained to "learn" from a training data set consisting of a large number of artificially generated known color images, including images of surfaces having a significant specular reflectance component. As hereinafter explained, the invention's neural network based methodology outperforms the prior art grey-world and white-patch algorithms, especially in the case of images containing a small number (1 to 5) of distinct RGB measurements. Accordingly, the invention is well suited to independent analysis of separate regions of an image, thus facilitating determination of multiple illuminants in a single scene.

Figure 1:
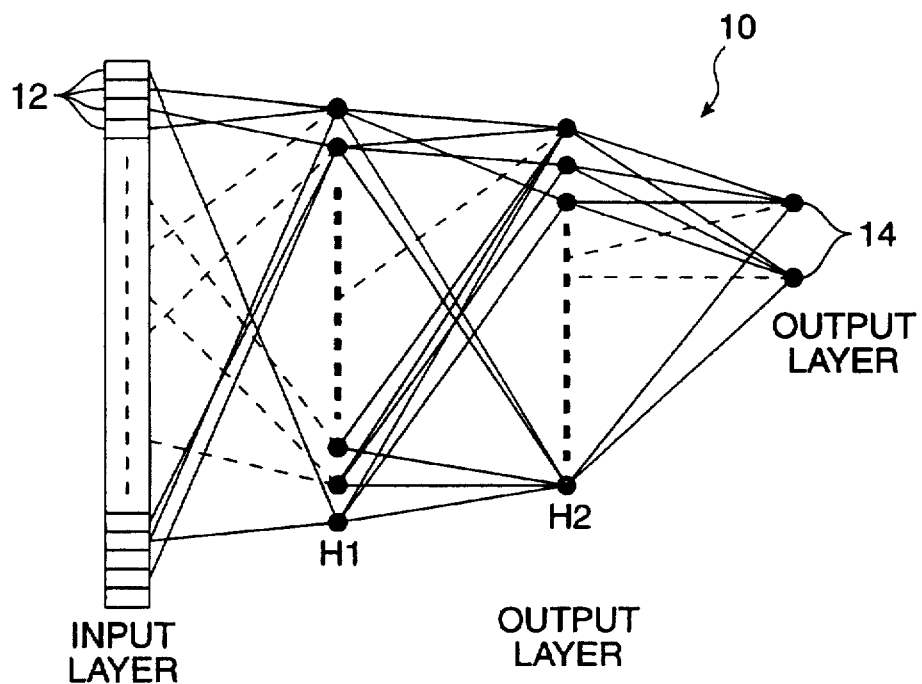
FIG. 1 is a schematic representation of a neural network architecture for implementing a preferred embodiment of the invention.

The preferred embodiment of the invention employs a feed-forward perceptron-like neural network 10, shown in FIG. 1 (see "An Introduction to Computing with Neural Nets", Lippmann, IEEE ASSP Magazine, April, 1987, pp. 11–15 for a discussion of perceptron neural networks). Neural network 10 has an input layer consisting of a large number of binary value input ports 12, an output layer consisting of two output ports 14, and two intermediate or "hidden" layers H1, H2.

Figure 2:
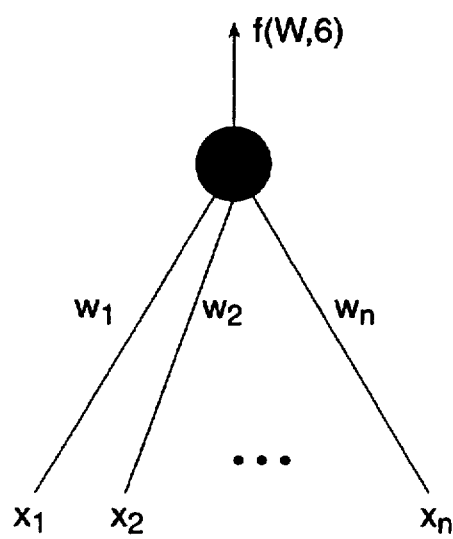
FIG. 2 is a schematic representation of a typical neuron in the FIG. 1 neural network.

FIG. 2 schematically illustrates one of the neurons (or ports) of neural network 10. $x_i$ are the inputs (binary values of 0 or 1, as hereinafter explained) and $W_i$ are the neuron weights. The neuron's output is a function of its total activation A:

$$A = \sum_{i=1}^{n} w_i \cdot x_i$$

The output transfer function f() is the sigmoid function:

$$f(A) = \frac{1}{1 + e^{-(A-\theta)}}$$

where $\theta$ is a threshold value and A is the neuron activation as above.

Since "color" is a perceptual quality, it is preferable to use a term such as "RGB" to mean the response of the image-taking camera at a given pixel. "Good performance" with only a small number of distinct RGB's thus means that the neural network is particularly well suited for processing small, local image regions. This is important because generally an imaged scene will contain more than one source of light, so the assumption that the scene illumination is constant will, at best, hold true only locally within an imaged scene.

Before an imaged scene is input to the neural network, each of the scene's colors is transformed from the RGB space into an intensity independent chromaticity space. Suppose that the color-encoded pixels are RGB-encoded pixels, where R, G and B are first, second and third color channel values respectively. Optionally, before the image colors are mapped into an intensity-independent chromaticity space, the image itself is divided into a plurality of separate portions. Then, the following steps are taken with respect to each portion of the image:

1. All pixels in the image portion having R, B or G values less than a selected minimum threshold are disregarded;
2. All pixels in the image portion having R, B or G values greater than a selected maximum threshold are disregarded;
3. The average R value of all non-disregarded pixels in the image portion is assigned as the image portion's R value;
4. The average G value of all non-disregarded pixels in the image portion is assigned as the image portion's G value; and,
5. The average B value of all non-disregarded pixels in the image portion is assigned as the image portion's B value.

Additionally and/or alternatively, before the image colors are mapped into an intensityindependent chromaticity space, the color-encoded pixels can be mapped into a color-encoding spectrally sharpened color space by combining the R, G and B color channels. The image is then divided into a plurality of separate portions as above; and, the five steps noted above are performed with respect to each portion of the image.

Any one of a number of different chromaticity spaces can be used, including rg, rb, bg, perspective or vector-norm chromaticity spaces. In this context, a "perspective"[1] chromaticity space has coordinates (r/b, g/b) and a vectornorm chromaticity space has coordinates $(r/(r^2+b^2+g^2)^{1/2}, b/(r^2+b^2+g^2)^{1/2})$. Other intensity-independent or lightnessindependent spaces such as those defined by the $u^*$, $v^*$ components or $a^*$, $b^*$ components of the CIE 1976 ($L^*u^*v^*$) and CIE 1976 ($L^*a^*b^*$) spaces (see: "Color Science: Concepts and Methods, Quantitative Data and Formulae, 2nd Edition, Gunter Wyszecki and W.S. Stiles, John Wiley & Sons Inc. 1982) may also be used.

Figure 3:
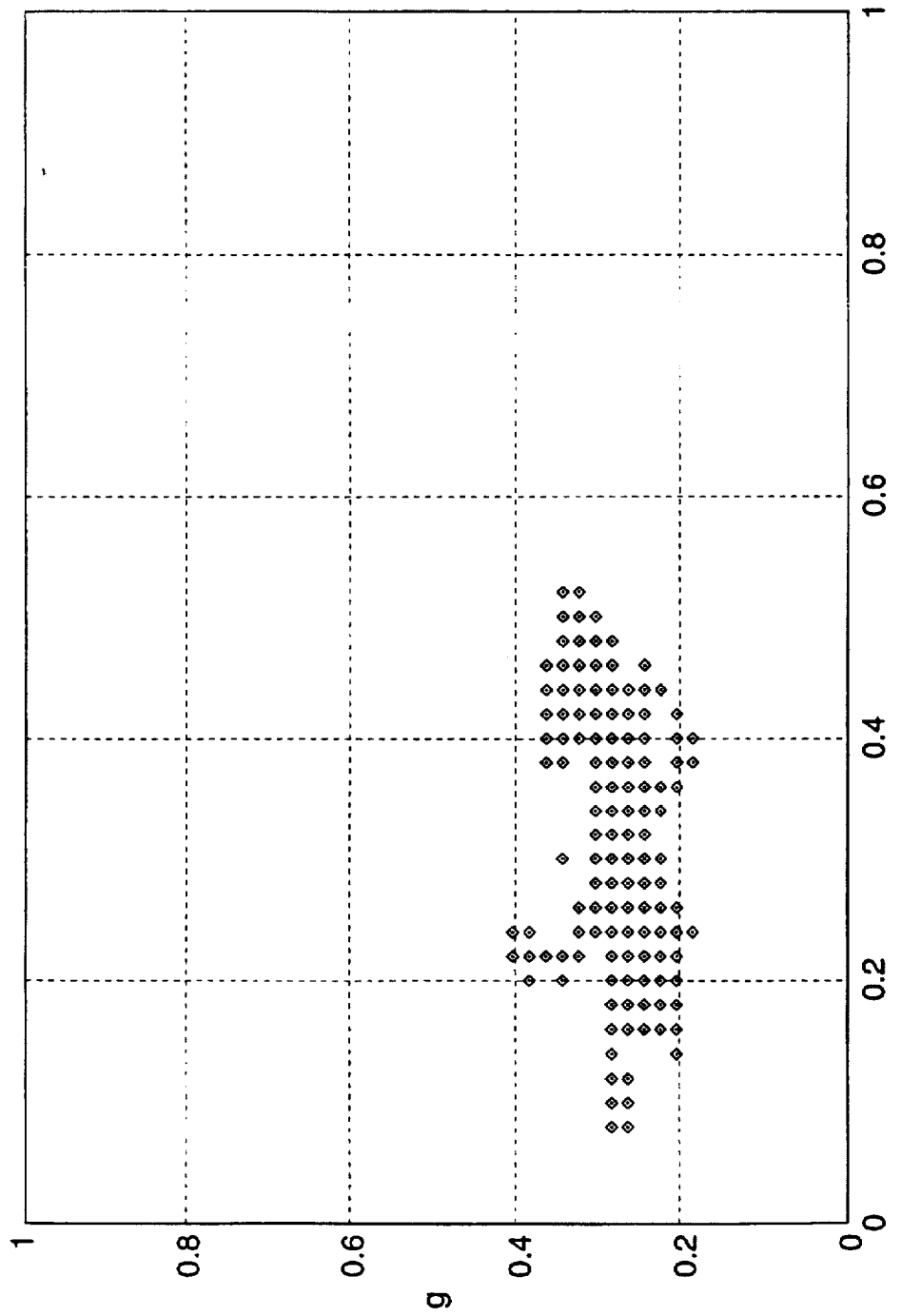
FIG. 3 is a graphical representation of a colored image transformed into a two dimensional chromaticity space.

Taking an rg chromaticity space as exemplary, the transformation r=R/(R+G+B) and g=G/(R+G+B) is employed. Thus, as shown in FIG. 3, after transformation to chromaticity space, all possible color chromaticities lie inside a square having sides of unit length; and, in fact, all the transformed data points lie in the lower left part of the square, under the diagonal. Transformation of colors from the 3 dimensional RGB space to the two dimensional rg chromaticity space results in loss of color intensity information, but preserves color chromaticity.

After all colors in a scene are transformed to the rg chromaticity space, that space is uniformly sampled over a grid of notional squares having sides of length "S". All colors inside any grid square correspond to one entry in an index array whose elements have binary values of either 0 (color not present in grid square); or, 1 (color present in grid square). More particularly, because the neural network's input ports 12 form a one dimensional array, the two dimensional chromaticity space values are further transformed into a one-dimensional array corresponding to the number of input ports 12.

The larger the input layer (i.e. the greater the value of n), the better the color resolution, although a very large input layer can significantly increase the required training time. Input layers having 900, 1600 and 2500 input ports have exhibited comparable results.

Discrete sampling as aforesaid results in some loss of resolution because only color approximations are retained. But, it has the advantage that permutation-independent data is extracted for input to the neural network. This substantially reduces the size of the training data set, significantly reducing the time required to train the neural network.

During the training process, the chromaticity of the illuminant of each artificially generated image is also provided to the neural network. The data points plotted in FIG. 3 correspond to colors present in a scene. The scene represented by FIG. 3 contains many colors. As can be seen, the data points do not cover the whole lower tri-angular region of the Figure since most colors occurring in nature are not very saturated.

The neural network's hidden layers H1, H2 are much smaller than the input layer, with about 100–150 ports being typical in hidden layer H1 and about 20–50 ports being typical in hidden layer H2. Hidden layer H1 is not fully connected to the input layer; instead, only about 200–400 randomly selected input ports 12 are initially connected to the H1 ports. Training can be done in accordance with the well known back-propagation algorithm: see Hertz et al, "Introduction to The Theory of Neural Computation", Addison-Wesley Publishing Company, pp. 115–120; or, the aforementioned Lippmann article at p. 17. The output values derived at output ports 14 constitute the desired estimate of the illuminant in the rg (or other selected) chromaticity space.

In addition, during training, connections previously made between any pair of ports in the input layer and H1 can be removed; or, new connections made between such ports. For example, if for all training data set images, a particular one of input ports 12 always receives a binary input value of 0, then that input port is disconnected from H1, a different input port is selected for connection to H1, and training continues. Accordingly, neural network 10 is adaptively configured in a manner dependent upon the training data set, to bias the network so that it will process colors which are likely to occur and bypass colors which are not likely to occur.

Typically, the training data set consists of 100–1000 scenes for each one of a number of different illuminants of interest. Each scene is composed of a number of artificially generated color "patches", which simulate real surfaces, as perceived by camera sensors under a specific illuminant. During training the training data set is presented several times to the network. As each data set scene is presented, the chromaticity space values derived at output ports 14 are compared with known chromaticity space values characterizing the (known) illuminant for that data set scene, to derive an error value representative of the difference between the known and derived values. The training process cycles through all scenes in the training data set as many times as are required to reduce the cumulative mean error below an acceptable threshold. In practice, a mean error below 0.008 is attainable. The error function used is the Euclidean distance in the chromaticity space between the known and derived values.

Output ports 14 yield two values which together represent the neural network's estimate of the chromaticity of the illuminant in the rg (or other selected) chromaticity space. These values range from 0.00 to 1.00. In order to convert back to an RGB color space, one may derive the blue component as b=1-r-g and then scale the r,g and b components by a selected factor. After deriving the color of the illuminant of an unknown imaged scene, one can easily determine what that scene would look like if illuminated by some other illuminant. Thus, the unknown scene image can be color-corrected to make it look like it was taken under a particular illuminant.

The colour of an image is corrected by multiplying the red channel (the red part of each pixel) by a first correction factor. The green channel is corrected by a second factor, and the blue channel is corrected by a third factor. If the camera's sensitivity functions are not relatively narrow band, then spectral sharpening can be used to combine the camera's RGB output responses, prior to multiplying by said correction factor, so as to optimize the performance of the color correction. For example, in the case of RGB color-encoded pixels, where R, G and B are first, second and third color channel values respectively, the RGB-encoded pixels can be mapped into a color-encoding spectrally sharpened color space by combining the three channels. Derivation of the factors is explained below. In many cases a subsequent brightness correction step is also required. Thus, depending on the application, it may be necessary to maintain or specify a brightness property. For example, it may be required that the output image have the same average brightness as the input image, or have some specified brightness value. Alternately, the brightness of each pixel in the output image may be required to be the same as the corresponding pixel in the input image. In each case, the necessary adjustments to the formulae for the correction factors are straightforward, as hereinafter shown.

In general, the colour correction procedure is based on the estimated chromaticity (p,q) of the unknown illuminant, and the known chromaticity of the target illuminant (p',q'). These chromaticities are meant to include all possible choices of chromaticity space. First, (p,q) is used to construct a possible RGB colour of the illuminant designated by (R,G,B). The same method is then used to construct a possible RGB colour of the illuminant, designated by (R',G',B'). The correction factors are the ratios of the three channel components, as follows:

Red channel correction factor: R'/R

Green channel correction factor: G'/G

Blue channel correction factor: B'/B

Calculation of (R,G,B) from (p,q) depends on the chromaticity space. For the most common chromaticity spaces we have:

(p,q) is (R/(R+G+B), G/(R+G+B)): (R,G,B) is (p, q, 1−p−q)

(p,q) is (R/(R+G+B), B/(R+G+B)): (R,G,B) is (p, 1−p−q, q)

(p,q) is (G/(R+G+B), B/(R+G+B)): (R,G,B) is (1−p−q, p, q)

(p,q) is (R/B, G/B): (R,G,B) is (p, q, 1)

(p,q) is (R/G, B/G): (R,G,B) is (p, 1, q)

(p,q) is (G/R, B/R): (R,G,B) is (1, p, q)

In the following, $Z=(R^2+G^2+B^2)^{1/2}$:

(p,q) is (R/Z, G/Z): (R,G,B) is $(p, q, (1-p^2-q^2)^{1/2})$ (p,q) is (R/Z, B/Z): (R,G,B) is $(p, (1-p^2-q^2)^{1/2}, q)$ (p,q) is (G/Z, B/Z) : (R,G,B) is $((1-p^2-q^2)^{1/2}, p, q)$

As mentioned above, the brightness of the image can be corrected, if needed. The chromaticity of a particular pixel does not change if each component is scaled by the same factor. Thus, each pixel can be corrected by a scaling "a" as follows:

(R, G, B)→(aR, aG, aB)

The scaling factor "a" need not be the same for each pixel, although it often is. One of three methods can be used.

In the first method, the average brightness of the output is set to a specific value M. N is defined as the number of pixels, and S is the sum of R+G+B over all pixels. Then the average brightness is given by A=S/N, and the scaling factor "a" above is given by M/A, with "a" being the same for each pixel.

The second method is simply a special version of the first method, in which M is set to the average brightness of the input image.

In the third method, the scaling factor "a" is computed on a pixel by pixel basis so that the brightness of each output pixel is the same as that of the corresponding input pixel. In other words, for each (R,G,B) pixel, a=(R+G+B)/(R'+G'+B').

Experimental Results and Comparisons

A FIG. 1 type neural network having a 1250 port input layer, a 32 port hidden layer H1 and a 2 port output layer (i.e. hidden layer H2 was eliminated) was trained as described above with a large number of synthesized images, each containing a random set of from 1 to 60 surface reflectances. The illuminant portion of the training data set contained the spectral power distributions of 89 different illuminants, measured with a Photoresearch PR650 spectrophotometer at different places around a university campus. The reflectance portion of the training data set contained the percent spectral reflectance functions obtained from 368 different surfaces. During training, for each illuminant, the number of synthesized images used usually ranged from 10 to 1,000. There was no noticeable improvement in the behaviour of the neural network, when trained on substantially larger training data sets.

The number of training epochs was kept relatively small to reduce the required training time and reduce the size of the training data set. The training set was composed of 8,900 images (i.e. 100 images for each illuminant) and each image had a random number of colors ranging from 1 to 60. The network was trained for 120 epochs. After completion of training the average error (i.e. Euclidean distance in the chromaticity space between the target output and the output obtained by the neural network) was 0.018608.

Following training, the neural network was tested on a different set of images generated by randomly selecting 1, 2, 3, 5 or 10 surface reflectances. For each of these cases 100 images were created. The average error obtained by the neural network for 100 images for each number of distinct reflectances is compared in Tables I and II (FIGS. 4 and 5 respectively) to that obtained by three prior art color constancy algorithms; namely, the aforementioned white-patch and grey-world algorithms; and, the 2D convex hull gamut mapping algorithms, with and without illumination constraints included. Comparisons with the aforementioned Wandell et al algorithm are not included, since that algorithm has been shown to exhibit poorer performance than any of the three prior art algorithms tabulated in FIGS. 4 and 5.

The error measures shown in Tables I and II are the angular error and the root mean square error. The angular error is computed by converting the rg chromaticities of the illumination's true chromaticity and its estimated chromaticity to 3-vectors and then measuring the angle between the two vectors. For the RMS error the chromaticities of all the surfaces in the image are corrected on the basis of each algorithm's illumination estimate. This yields an image as the algorithm would expect it to be under the standard illuminant. The difference between the true chromaticities under the standard illuminant and those estimated by the algorithm is measured by the RMS error taken over all surfaces in the image.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A method of estimating the chromaticity of illumination of a colored image consisting of a plurality of color-encoded pixels which define a corresponding plurality of image colors, said method comprising the steps of:
   a. mapping said image colors into an intensity-independent chromaticity space;
   b. dividing said chromaticity space into a plurality of separate regions;
   c. for each one of said regions:
      i. assigning a first value to said region if said region contains no chromaticity value corresponding to any of said image colors;
      ii. assigning a second value to said region if said region contains a chromaticity value corresponding to any of said image colors;
   d. applying each one of said assigned values to a different one of a plurality of input ports in an input layer of a pre-trained neural network, said neural network having:
      i. an output layer containing two output ports;
      ii. at least one intermediate layer containing a plurality of ports connectible between selected ports in layers adjacent to said intermediate layer; and,
   e. reading, at said respective output ports, chromaticity space values which characterize said chromaticity of illumination.

2. A method as defined in claim 1, wherein said step of mapping said image into an intensity-independent chromaticity space further comprises mapping said image into a two dimensional chromaticity space.

3. A method as defined in claim 2, wherein:
   a. said two dimensional chromaticity space is one of:
      i. an rg chromaticity space;
      ii. an rb chromaticity space;
      iii. a bg chromaticity space;
      iv. a perspective chromaticity space;
      v. a vector-norm chromaticity space;
      vi. a u*v* chromaticity space;
      vii. an a*b* chromaticity space;
   b. said color-encoded pixels are RGB-encoded pixels, where R, G and B are first, second and third color channels respectively, and said step of mapping said image into said two dimensional chromaticity space further comprises:
      i. if said two dimensional chromaticity space is said rg chromaticity space, transforming each one of said RGB pixels to yield (p,q) components, where p is defined to be R/(R+G+B) and q is defined to be G/(R+G+B);
      ii. if said two dimensional chromaticity space is said rb chromaticity space, transforming each one of said RGB pixels to yield (p,q) components, where p is defined to be R/(R+G+B) and q is defined to be B/(R+G+B);
      iii. if said two dimensional chromaticity space is said bg chromaticity space, transforming each one of said RGB pixels to yield (p,q) components, where p is defined to be B/(R+G+B) and q is defined to be G/(R+G+B);
      iv. if said two dimensional chromaticity space is said perspective chromaticity space, transforming each one of said RGB pixels to yield (p,q) components, where:
         (1) p is defined to be R/B and q is defined to be G/B; or,
         (2) p is defined to be R/G and q is defined to be B/G; or,
         (3) p is defined to be B/R and q is defined to be G/R;
      v. if said two dimensional chromaticity space is said vector-norm chromaticity space, transforming each one of said RGB pixels to yield (p,q) components, where:
         (1) p is defined to be $R/(R^2+G^2+B^2)^{1/2}$ and q is defined to be $B/(R^2+G^2+B^2)^{1/2}$; or,
         (2) p is defined to be $R/(R^2+G^2+B^2)^{1/2}$ and q is defined to be $G/(R^2+G^2+B^2)^{1/2}$; or,
         (3) p is defined to be $B/(R^2+G^2+B^2)^{1/2}$ and q is defined to be $G/(R^2+G^2+B^2)^{1/2}$; or,
      vi. if said two dimensional chromaticity space is said $u^*v^*$ chromaticity space, transforming each one of said RGB pixels to yield (p,q) components, where p is defined to be the $u^*$ component of a CIE 1976 ($L^*u^*v^*$) chromaticity space and q is defined to be the $v^*$ component of said CIE 1976 ($L^*u^*v^*$) chromaticity space; and,
      vii. if said two dimensional chromaticity space is said $a^*b^*$ chromaticity space, transforming each one of said RGB pixels to yield (p,q) components, where p is defined to be the $a^*$ component of a CIE 1976 ($L^*a^*b^*$) chromaticity space and q is defined to be the $b^*$ component of said CIE 1976 ($L^*a^*b^*$) chromaticity space.

4. A method as defined in claim 1, further comprising, before said step of applying said assigned values to said neural network input layer input ports, mapping said assigned values into a one-dimensional input space containing a plurality of input values corresponding to said plurality of input ports.

5. A method as defined in claim 1, further comprising pre-training said neural network by:
   a. connecting an arbitrary number of said input layer ports to selected ports in one of said intermediate layers adjacent to said input layer;
   b. connecting said one intermediate layer's ports to ports in another of said layers adjacent to said one intermediate layer, and further connecting any remaining ones of said intermediate layers to a next adjacent one of said layers until all of said adjacent layers are connected;
   c. assigning, to each one of said connections, a selected weight value for altering signals transmitted by each of said connections by a selected amount;
   d. for each one of a plurality of pre-stored data sets, each of said data sets containing values characterizing presence or absence of color in selected regions of one of a corresponding plurality of known colored images:
      i. selecting a different one of said pre-stored data sets;
      ii. applying to said input layer said color presence/absence values contained in said data set;
      iii. comparing said two chromaticity space values derived at said respective output ports with known chromaticity space values characterizing illumination of said known colored image to derive an error value representative of difference therebetween;

iv. selectively reassigning said weight values to reduce said error value while minimizing changes to minimized error values previously obtained in performing this step (d) in respect of data sets other than said one data set; and, e. repeating step (d) until said error value is minimized to a value less than a selected threshold.

6. A method as defined in claim 1, wherein:

a. said input layer has about 900 to 2,500 input ports; and, b. said intermediate layer has about 100 to 150 input ports.

7. A method as defined in claim 1, wherein:

a. said input layer has about 1,000 input ports;

b. said intermediate layer has about 100 to 150 input ports; and, c. said neural network further comprises a second intermediate layer having about 20–50 ports, said second intermediate layer connectible between selected ports in said at least one intermediate layer and in said output layer.

8. A method as defined in claim 1, wherein said color-encoded pixels are RGB-encoded pixels, where R, G and B are first, second and third color channel values respectively, said method further comprising, before said claim 1(a) step:

a. dividing said image into a plurality of separate portions;

b. for each one of said portions:

i. disregarding all pixels in said portion having R, B or G values less than a selected minimum threshold;

ii. disregarding all pixels in said portion having R, B or G values greater than a selected maximum threshold;

iii. assigning, as said portion's R value, the average R value of all pixels in said portion which have not been disregarded;

iv. assigning, as said portion's G value, the average G value of all pixels in said portion which have not been disregarded; and, v. assigning, as said portion's B value, the average B value of all pixels in said portion which have not been disregarded.

9. A method as defined in claim 1, wherein said color-encoded pixels are RGB-encoded pixels, where R, G and B are first, second and third color channels respectively, said method further comprising, before said claim 1(a) step, mapping said color-encoded pixels into a color-encoding spectrally sharpened color space by combining said channels.

10. A method as defined in claim 1, wherein said color-encoded pixels are RGB-encoded pixels, where R, G and B are first, second and third color channels respectively, said method further comprising, before said claim 1(a) step:

a. mapping said color-encoded pixels into a color-encoding spectrally sharpened color space by combining said channels;

b. dividing said image into a plurality of separate portions;

c. for each one of said portions:

i. disregarding all pixels in said portion having R, B or G values less than a selected minimum threshold;

ii. disregarding all pixels in said portion having R, B or G values greater than a selected maximum threshold;

iii. assigning, as said portion's R value, the average R value of all pixels in said portion which have not been disregarded;

iv. assigning, as said portion's G value, the average G value of all pixels in said portion which have not been disregarded; and, v. assigning, as said portion's B value, the average B value of all pixels in said portion which have not been disregarded.

11. A method as defined in claim 5, wherein said selectively reassignment of said weight values further comprises calculation of said weight values by backpropagation.

12. A method as defined in claim 5, further comprising, after said step 5(d) and before said step 5(e), adaptively reconnecting said intermediate layer ports to said input layer ports to selectively eliminate connections to input layer ports which repeatedly receive zero value inputs.

13. A method as defined in claim 5, wherein at least some of said known colored images include surfaces having a significant specular reflectance component.

* * * * *